April 16, 1940. E. J. DECKER 2,197,252
OIL FILTER
Filed May 9, 1938 2 Sheets-Sheet 1

INVENTOR.
Earl J. Decker
BY Samuel Weisman
ATTORNEY.

April 16, 1940.  E. J. DECKER  2,197,252
OIL FILTER
Filed May 9, 1938  2 Sheets-Sheet 2
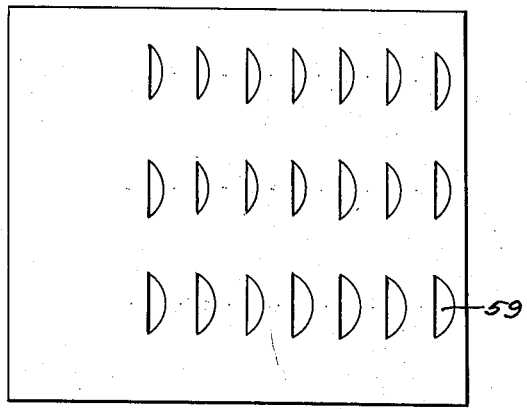
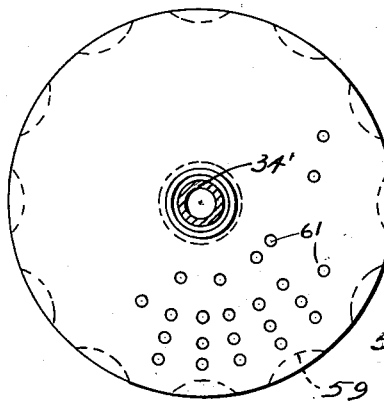
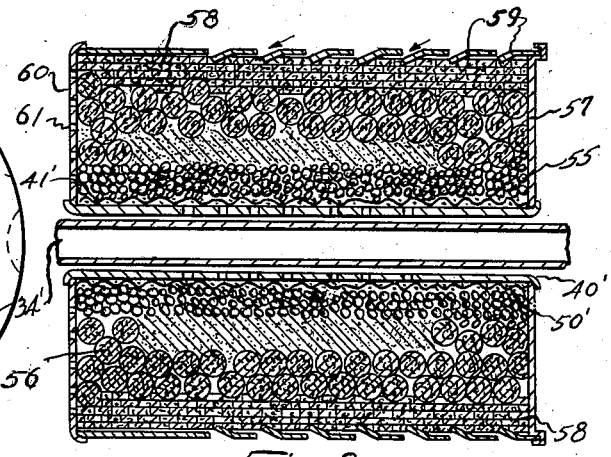
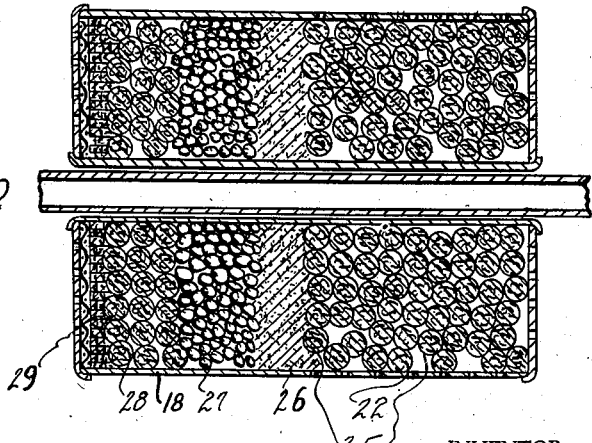
INVENTOR.
Earl J. Decker
BY Samuel Wieman
ATTORNEY.

Patented Apr. 16, 1940

2,197,252

UNITED STATES PATENT OFFICE 2,197,252

OIL FILTER

Earl J. Decker, Detroit, Mich.

Application May 9, 1938, Serial No. 206,710

2 Claims. (Cl. 210—131)

The present invention pertains to novel oil filters and filtering material for the same. The filters involved are of the type designed to be connected to a flowing stream of oil, as in conjunction with the lubricating system of a machine or the fuel supply for a Diesel engine.

One of the objects of the invention is to provide a filtering material that is more satisfactory than those now commonly used in replaceable cartridges for oil filters. Certain materials now in use are objectionable because of their short life and deterioration by acid in the oil. According to the invention, the filtering material includes oil treated oakum cord which has been found to be a very satisfactory oil filter even when used alone. It is preferred however to use, in conjunction with the oakum, a finer filter such as a mixture of pulp ash and charcoal for taking up the finer particles that might escape through the oakum. Other materials such as asbestos wicker and wicker hemp are preferably, although not necessarily, added since they seem to improve the structural as well as the filtering qualities of the mass. With the exception of the pulp ash and charcoal, the materials are applied in the form of windings.

The invention also includes a simple and inexpensive construction for housing the cartridge and effecting an advantageous circulation of oil therethrough. The fixed structure comprises a substantially cylindrical casing having at one end an inlet and outlet fitting and at the other end a removable cover. In the fitting is secured a center pipe which is also a part of the fixed structure. The cartridge is in the form of a can having an axial tube around which the above mentioned filtering materials are packed. The cartridge is inserted through the open end of the casing, with its tube fitting over the fixed tube, and the cover is then secured in place. The can is perforated to induce flow of oil therethrough either longitudinally or radially, as desired, both constructions being shown herein.

The invention also provides locking means for the cover and a safety escape for oil in the event the filter mass becomes clogged.

The invention is fully disclosed by way of example in the following description and in the accompanying drawings, in which Figure 1 is an end view of a filter unit according to the invention;

Figure 7 is a plan view of a modified form of cartridge can;

Figure 8 is a longitudinal section thereof, showing the filtering material used therein and in Figure 3;

Figure 9 is an end view of Figure 8, and

Figure 10 is a detail section of the cartridge shown in Figure 2 and illustrating the filtering material used therein.

Reference to these views will now be made by use of like characters that are employed to designate corresponding parts throughout.

Figure 1:
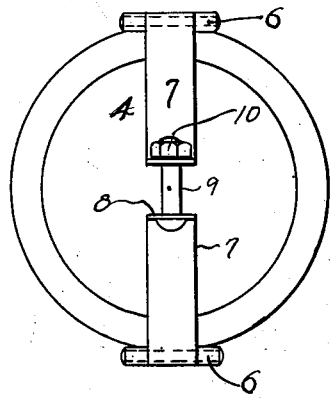
Figure 2:
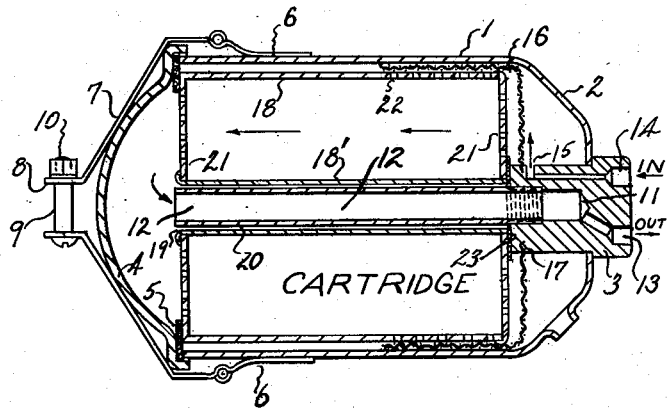
Figure 2 is a longitudinal section thereof.
Figure 5:
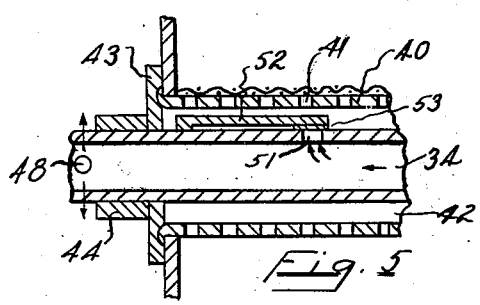
Figures 5 and 6 are enlarged details of Figure 3.
Figure 6:
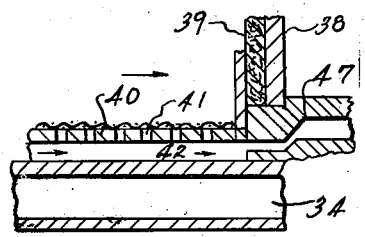
Figure 4:
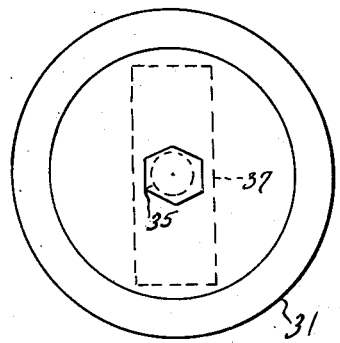
Figure 4 is an end view thereof.

In Figure 2 is illustrated a cylindrical case 1 adapted to contain a replaceable filtering cartridge as will presently be described in detail. In using the filtering unit on an automobile engine, it may be more convenient to mount the unit in a vertical position, although the particular positioning of the unit is a matter of choice and convenience.

One end of the casing 1 is tapered at 2 and receives a fitting 3. The other end of the casing 1 is open for removal and insertion of the inner cartridge. This end is equipped with a dome shaped cover 4, between which and the adjacent end of the casing is inserted a suitable gasket 5.

The lock for securing the cover 4 in place includes a pair of hinge members 6 welded or otherwise secured to the cylindrical wall of the casing at diametrically opposite points thereof. To each member 6 is hinged a strap 7 extending over the dome of the cover to a point near the center of the latter. The free ends of the straps 7 are bent at 8 to a position parallel to the axis of the casing 1 and parallel to each other. Through these ends is passed a bolt 9 having at one end a nut 10 which, when tightened, secures the cover 4 to the casing.

It will be understood that in assembling the inner parts, now to be described, the cover is removed and the straps 7 thrown back. The fitting 3 has an axial cavity 11 into which is secured a center tube 12 by screwing, press fit or any other suitable means. This tube is co-extensive and co-axial with the cylindrical portion of the casing 1 and is not removed when inserting a cartridge. A passage 13 leads from the outer end of the fitting 3 to the cavity 11 and serves as the outlet from the unit. Another passage 14 leads from the outer end of the fitting to a slot 15 in the wall of the fitting for the inlet.

On the inner end of the fitting is mounted a screen cup 16 having its side wall close to the cylindrical wall of the casing 1 and extending about half of the length of the latter. The center of the cup is secured at 17 to the fitting at a position inward of the slot 15. For this purpose a peripheral groove may be formed in the fitting at 17 and the base of the cup snapped therein.

The cartridge comprises filtering material packed in a cylindrical can 18 which, for the most part, is of conventional construction and made according to well known methods. Through the center of the can is passed an axial tube 18' known as a stall pipe and having its ends beaded against or otherwise secured to the ends of the can, as indicated by the numeral 19. The internal diameter of the stall pipe is slightly larger than the outside diameter of the tube 12, leaving a space 20 between the two when the device is assembled, as clearly shown in Figure 2.

The end walls of the can 18 are perforated as designated by numeral 21. The cylindrical wall is perforated at 22 along the portion lying within the screen cup 16 which extends about half the length of the can. The flow is from the inlet 14, 15 through the screen cup 16 and perforations 21 and 22 immediately adjacent thereto. Thus, all the oil is screened before reaching the filter mass within the can. In this connection it will be noted that the gasket 5 also seals the space between the can 18 and the casing 1. From the cartridge the oil flows through the perforations 21 nearer the cover 4 and thence into the adjacent end of the center tube 12. A gasket 23 is inserted between the inner end of fitting 3 and the adjacent end of the can, so that the flow is confined to the path previously outlined. From the interior of the tube 12, the oil is withdrawn to chamber 11 and outlet 13. The outlet 13 and inlet 14 are obviously connected to the oil line so that the oil is driven through the filter while circulating.

The composition and arrangement of the filtering material in this type of cartridge, where the flow is substantially lengthwise, is illustrated in Figure 10. Oil treated oakum cord 25 is wound in approximately the first half of the can, that is, the portion having the perforations 22. Next is a rather fine mixture of pulp ash and charcoal, indicated by the numeral 26. Adjacent to this are windings of asbestos wicker 27 for somewhat less than one-fourth the length of the can. Next to this are more windings of oil treated oakum cord 28, and finally some windings of hemp tape 29 complete the contents of the can. The windings may be made by turning the can on a lathe or by any other suitable means, and then assembling the pipe 18' therein.

The oil first comes into contact with the oakum which removes the heavier particles. Next, it passes through the fine mixture of pulp ash and charcoal which removes the smaller particles. This material also scatters the oil into fine streams and does tend to form large openings through which the oil would be by-passed. It has been found in this connection that pulp ash alone, although originally a fine filter, rapidly becomes plugged and does not have a long filtering life. The stability of the material for filtering purposes is increased by its admixture with charcoal and the anterior position of the oakum which acts as a protector, especially in removing the larger particles.

Having been scattered by the pulp ash and charcoal, as above set forth, the oil next passes through the asbestos wicker which is also a fine and effective filter. The oil is given a final filtering treatment in passing through the next quantity of oakum 28 and the hemp 29, although these last two layers are not altogether indispensable.

The oil treatment of the oakum before placing the filter in service gives it an immediate high conductivity to oil. Otherwise, some time would be required in saturating the oakum before adequate flow and filtering action are established. It has also been found that the materials here described excel the more common filtering materials in filtering capacity, useful life and resistance to the acids occurring in oil.

In the modification shown in Figures 3 to 6, the casing 30 and cover 31 are shaped as previously described. Similarly, an inlet and outlet fitting 32 is inserted in the conical end 33 of the casing. The center tube 34 inserted in the fitting is, however, extended through the cover 31 and has an acorn nut 35 screwed on its exposed end. The cartridge can 36 has the same general construction as in Figure 2 and is held seated against the fitting 32 by a bent spring 37 forced by the cover 31 against the adjacent end of the can. At the fitting 32 is a sealing ring 38 between which and the adjacent end of the can is inserted a gasket 39.

This can also has an axial stall pipe 40 which however is perforated at 41 throughout its entire length. This pipe is spaced around the center tube 34, forming therewith an annular passage 42. This space is sealed at the cover by a washer 43 mounted on the tube 34 and held in position by a sleeve 44 having a press fit on the tube 34, as shown in detail in Figure 5.

The tube 34 communicates with a chamber 45 in the fitting 32, and the chamber in turn communicates with an inlet passage 46. The outlet passage 47 is formed in the fitting in such a manner as to communicate only with the space 42.

Figure 3:
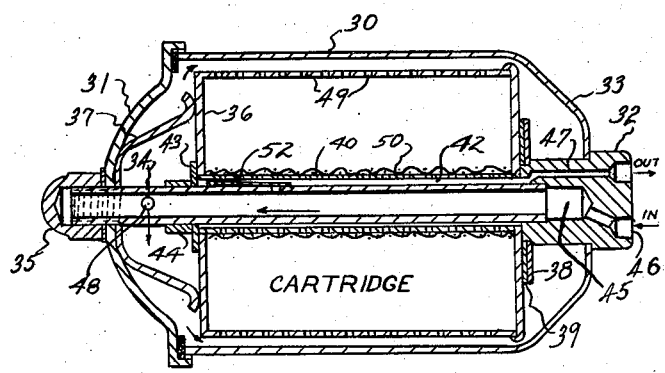
Figure 3 is a longitudinal section of a modified construction.

The center tube 34 is formed with ports 48 establishing communication with the interior of the casing 30. The oil entering the casing through the inlet 46, tube 34 and ports 48 enters the can 36 by perforations 49 in the cylindrical wall thereof, the ends of the can being solid as shown in Figure 3. The stall pipe 40 is surrounded by a screen 50. The oil leaves the cartridge through the perforations 41, space 42 and outlet 47.

The tube 34 is also formed with a safety port 51 within the stall pipe 40. On the tube 34 is fixed one end of a spring strip carrying at its free end a valve member 53 normally covering the port 51. In the event that the filter mass becomes clogged and does not permit oil to pass therethrough, the pressure of the oil within the tube 34 will lift the valve 53 and permit flow of unfiltered oil to the outlet for the lubrication of certain parts that would burn out even during a temporary absence of lubrication.

The flow of oil in this construction is radial as distinguished from the longitudinal flow in Figures 2 and 10. The arrangement of the filtering material or radial flow is therefore different and is illustrated in Figure 8. First, several windings of asbestos wicker are placed along the entire length of the stall pipe 40' after the screen 50' has been applied thereto. The asbestos wicker is designated by the numeral 55. Next, a fine mixture of pulp ash and charcoal 56 is packed around the windings 55 but terminates short of the ends of the latter. Over this are windings 57 of oil treated oakum cord which also fills in at the ends of the mass of pulp ashes and charcoal. Over the oakum are windings of hemp tape, indicated by the numeral 58.

The cartridge can illustrated in Figure 8 is a modified construction that may be substituted in Figure 3. The perforations in the cylindrical wall are formed by louvers 59 of substantially semi-elliptical shape and stamped inward. The end wall 60 near the dome or cover is perforated at 61 to take the fluid that passes out of the adjacent end of the center tube 34'. The major portion of the oil enters the can through the louvers 59 and must therefore pass through all the filtering ingredients to reach the perforations 41' of the pipe 40. These perforations are preferably confined to the half of the pipe nearer the outlet of the center tube 34', in which position they compel a longer travel of the oil through the filter mass.

The oakum cord has a diameter of approximately one-half to three-quarters of an inch, as a consequence of which there occur spaces between at least some of the windings. These spaces can hold a considerable quantity of the material filtered out without obstructing the filtering material. Such obstruction would occur in a more tightly packed filter and particularly at the portion thereof first engaged by the oil, without even permitting the succeeding parts of the filter to be fully utilized. In view of such behavior of a filter, the windings herein may be increasingly tighter in the direction of flow.

Although specific embodiments of the invention have been illustrated and described, it will be understood that various alterations in the details of construction may be made without departing from the scope of the invention, as indicated by the appended claims.

What I claim is:

1. A filter comprising an outer closed casing, a solid tube supported therein, a receptacle disposed in said casing around said tube and spaced from the inner surfaces of said casing, a center tube fitted to the end walls of said receptacle and spaced around said solid tube, said center tube and a parallel wall of said receptacle having openings for the flow of fluid therethrough, filtering material in said receptacle between its perforated wall and said center tube, means of communication between said solid tube and said receptacle exteriorly of the latter, liquid-tight connections between said tubes and the ends of said receptacle, and a fitting extending through an opening in the casing and applied to one end of both tubes, said fitting having a passage communicating with said solid tube and another passage communicating with the space between said tubes.

2. A filter comprising an outer closed casing, a solid tube supported therein, said tube having a port intermediate the ends thereof, a receptacle disposed in said casing around said tube and spaced from the inner surfaces of said casing, a center tube fitted to the end walls of said receptacle and spaced around said solid tube, said center tube and a parallel wall of said receptacle having openings for the flow of fluid therethrough, filtering material in said receptacle between its perforated wall and said center tube, means of communication between said solid tube and said receptacle exteriorly of the latter, liqiud-tight connections between said tubes and the ends of said receptacle, and an outwardly opening check valve over said port and in the space between said tubes, a fitting extending through an opening in the casing and applied to one end of both tubes, said fitting having a passage communicating with said solid tube and another passage communicating with the space between said tubes.

EARL J. DECKER.